US010084817B2

(12) United States Patent
Saher et al.

(10) Patent No.: US 10,084,817 B2
(45) Date of Patent: Sep. 25, 2018

(54) MALWARE AND EXPLOIT CAMPAIGN DETECTION SYSTEM AND METHOD

(71) Applicant: NSS Labs, Inc., Austin, TX (US)

(72) Inventors: Mohamed Saher, Austin, TX (US); Jayendra Pathak, Austin, TX (US)

(73) Assignee: NSS Labs, Inc., Austin, TX (US)

( * ) Notice: Subject to any disclaimer, the term of this patent is extended or adjusted under 35 U.S.C. 154(b) by 0 days.

(21) Appl. No.: 14/482,696

(22) Filed: Sep. 10, 2014

(65) Prior Publication Data

US 2015/0074810 A1 Mar. 12, 2015

Related U.S. Application Data

(60) Provisional application No. 61/876,704, filed on Sep. 11, 2013.

(51) Int. Cl.
*G06F 11/00* (2006.01)
*G06F 12/14* (2006.01)
*H04L 29/06* (2006.01)
*G06F 17/30* (2006.01)
*G06F 21/53* (2013.01)
*G06F 21/56* (2013.01)

(52) U.S. Cl.
CPC .... *H04L 63/1491* (2013.01); *G06F 17/30864* (2013.01); *G06F 21/53* (2013.01); *G06F 21/566* (2013.01); *H04L 63/0272* (2013.01); *H04L 63/1416* (2013.01); *H04L 63/1466* (2013.01)

(58) Field of Classification Search
None
See application file for complete search history.

(56) References Cited

U.S. PATENT DOCUMENTS

| 8,407,785 | B2* | 3/2013 | Sidiroglou | H04L 12/585 726/22 |
| 9,355,247 | B1* | 5/2016 | Thioux | G06F 21/55 |
| 2010/0122343 | A1* | 5/2010 | Ghosh | G06F 21/55 726/23 |

(Continued)

FOREIGN PATENT DOCUMENTS

TW 201329774 7/2013

OTHER PUBLICATIONS

PCT International Search Report of PCT/US14/55198; dated Mar. 6, 2015; (2 pgs.).

(Continued)

*Primary Examiner* — Farid Homayounmehr
*Assistant Examiner* — Olanrewaju J. Bucknor
(74) *Attorney, Agent, or Firm* — DLA Piper LLP (US)

(57) ABSTRACT

A malware and exploit campaign detection system and method are provided that cannot be detected by the malware or exploit campaign. The system may provide threat feed data to the vendors that produce in-line network security and end point protection (anti virus) technologies. The system may also be used as a testing platform for $3^{rd}$ party products. Due to the massive footprint of the system's cloud infrastructure and disparate network connections and geo-location obfuscation techniques, NSS can locate and monitor malware across the globe and provide detailed threat analysis for each specific region, as they often support and host different malware/cybercrime campaigns.

14 Claims, 9 Drawing Sheets

(56) References Cited

U.S. PATENT DOCUMENTS

| | | | |
|---|---|---|---|
| 2010/0192223 A1* | 7/2010 | Ismael | G06F 21/566 |
| | | | 726/22 |
| 2011/0078794 A1 | 3/2011 | Manni et al. | |
| 2011/0099620 A1* | 4/2011 | Stavrou | G06F 21/566 |
| | | | 726/12 |
| 2011/0145920 A1 | 6/2011 | Mahaffey et al. | |
| 2011/0238855 A1* | 9/2011 | Korsunsky | G06F 21/55 |
| | | | 709/231 |
| 2011/0247072 A1* | 10/2011 | Staniford | H04L 63/1416 |
| | | | 726/24 |
| 2011/0314546 A1* | 12/2011 | Aziz | G06F 21/56 |
| | | | 726/24 |
| 2012/0144492 A1 | 6/2012 | Griffin et al. | |
| 2012/0174186 A1 | 7/2012 | Aziz et al. | |
| 2012/0331553 A1* | 12/2012 | Aziz | G06F 21/554 |
| | | | 726/23 |
| 2013/0014259 A1 | 1/2013 | Gribble et al. | |
| 2013/0055396 A1 | 2/2013 | Wang et al. | |
| 2013/0074185 A1 | 3/2013 | McDougal et al. | |
| 2013/0097706 A1* | 4/2013 | Titonis | G06F 21/56 |
| | | | 726/24 |
| 2013/0117848 A1 | 5/2013 | Golshan et al. | |
| 2013/0133072 A1 | 5/2013 | Kraitsman et al. | |
| 2015/0007312 A1* | 1/2015 | Pidathala | H04L 63/145 |
| | | | 726/22 |
| 2015/0381637 A1 | 12/2015 | Raff et al. | |

OTHER PUBLICATIONS

PCT Written Opinion of the International Searching Authority of PCT/US14/55198; dated Mar. 6, 2015; (5 pgs.).
Taiwanese Office Action with Search Report of TW 103131387 (in Chinese); dated Sep. 28, 2015; (5 pgs.).

* cited by examiner

FIGURE 6

MALWARE AND EXPLOIT CAMPAIGN DETECTION SYSTEM AND METHOD

PRIORITY CLAIMS/RELATED APPLICATIONS

This application claims priority under 35 USC 120 and the benefit under 35 USC 119(e) to U.S. Provisional Patent Application Ser. No. 61/876,704 filed Sep. 11, 2013 and entitled "Malware And Exploit Campaign Detection System And Method", the entirety of which is incorporated herein by reference.

BACKGROUND

Intrinsically modern malware and exploit campaigns are growing in sophistication related to obfuscation, deployment, and execution in an effort to avoid detection and analysis by security researchers, and modern security systems and software. Anti virus (AV) systems, such as endpoint protection platforms (EPPs), as well as breach detection services (BDS) employ virtual "sandboxes" or "honey nets" that operate in a cloud (virtual) network construct. These sandboxes attempt to identify malware and virus programs by incubating the suspect software until such time as the malware executes and it's activities can be monitored and analyzed. These systems often fail to identify previously unknown malware due to the evolution within malware development that allows the malware to recognize when it is sitting in such a system/trap. Modern malware can be considered to be "cognitive" and completely aware that it is currently being incubated within a trap (monitored system), and will continue to hibernate and therefore will not present itself as malicious software. Thus the sandbox system will fail to identify the suspect file as being malicious, and therefore will allow all similar programs to bypass future testing.

BRIEF SUMMARY

The system and method for malware and exploit campaign detection (that may be known as "BaitNET") is different than known systems since the system has technology that prevents detection of the system by the malware/exploit. Unlike other technologies, BaitNET cannot be detected by modern malware/exploits and thus the operations/actions of the malware/exploits can be collected and analyzed without restriction. The collected malware/exploit is replayed/tested against various operating system and application configurations within BaitNet's private cloud infrastructure to determine what other system footprints are susceptible to the malware campaign. BaitNet is able to successfully incubate, track, and inventory the malware/exploit. Due to the transparency of BaitNET to the malware/exploit, BaitNET is able to perform live analysis that that can track threat actors, identify where they are truly located, and what other similar malware/exploit campaigns they have been launching and against whom. All of this is done while BaitNET produces threat forecasts that indicate viable and potential targets of the threat actors. BaitNET can also be used to measure and test the effectiveness of commercially available EPPs, AVs, in-line network security appliances, and BDS systems. This is done by injecting malware/exploits into BaitNET's construct, where these commercial products have already been installed, and then monitoring the delta between what BaitNET knows was injected, and what the commercial product claims to have detected. E.g., BaitNET is an advancement in technology so far beyond modern AV, EPP, and BDS that it is used to test the efficacy of these commercial products.

In one implementation, BaitNET is the conglomerate of a number of software applications, processes, and innovations as outlined herein which afford BaitNET the ability to shim into the operating system and the virtual machine architecture (both guest and host) enabling BaitNET to obfuscate the fact that the machine itself is a virtual/unmanned computer. The system utilizes a multitude of virtual private networks (VPNs) allowing a near-unlimited number of unique Internet IP addresses from all across the world to be used. These disparate IP addresses afford two primary advantages to BaitNET. One, in order to force re-infection, as many malware system will not "drop" (deploy) malware to the same IP address more than once, it is necessary to have BaitNET obfuscate its Internet presence. Two, many malware campaigns limit their targets by geo-location, which is often tracked via IP Address. E.g., Malware-infected servers often limit themselves to only infecting one (1) computer from any given masked IP address, and may limit the country of origin of the IP addresses that they will infect. BaitNET utilizes VPNs throughout the world to mimic dispersed geo-location and map out malware campaigns in different regions. Other techniques, while not proprietary to BaitNET, may also be used to emulate potential target qualification data points such as varying the language pack and keyboard language configuration on the host operating system.

After finding new malware, done by crawling URLs provided through various channels, BaitNET records the attack vector, payload, critical information on exploitation, and other relevant metadata and then "replays" this attack against thousands of other hosts on the BaitNET network. "Replay" is achieved through the use of BaitNET's proxy services, as outlined later in this document, and may be done against a singular image when testing the efficacy of a $3^{rd}$ party security system or against limitless iterations of operating systems, application configurations, and versions of software tools when mapping the effectiveness of the exploit/malware. Each of the hosts used during the replay has a different combination of web browser, suite of installed applications, various program and operating system patch levels, installed language packages, etc. The representation of systems are nearly all possible combinations, Windows and OS X, from 2005 to present day. BaitNET is also capable of emulating mobile device operating systems, and uses the same technology to detect and inventory malware/exploits. All of this allows researchers to understand the true target landscape/scope for the malware/exploit, and the malware/exploit can be tested against anti virus (AV) and in-line security systems such as intrusion prevention systems (IPS), next generation firewalls (NGFs), and breach detection systems (BDS.)

DETAILED DESCRIPTION OF ONE OR MORE EMBODIMENTS AND IMPLEMENTATIONS OF THE SYSTEM AND METHOD

BiatNET is designed to seek-out, detect, itemize, and replay/retest active malware campaigns and new exploits.

BaitNET is an multi-leveled application operating within the kernel and application-process layers of the operating system, with hooks and function capabilities that make it stand-out from other technologies utilized to detect malware. It is most commonly used to test these other products, e.g. antivirus applications (aka "Enterprise Endpoint Protection") and therefore has been shown to be far more effective at detecting such malware. BaitNET supports various types of OSes as a threat forecast system. BaitNET's Virtual Machines (VMs) can simulate servers, workstations, even mobile computing devices such as smartphones and tablets.

Figure 1:
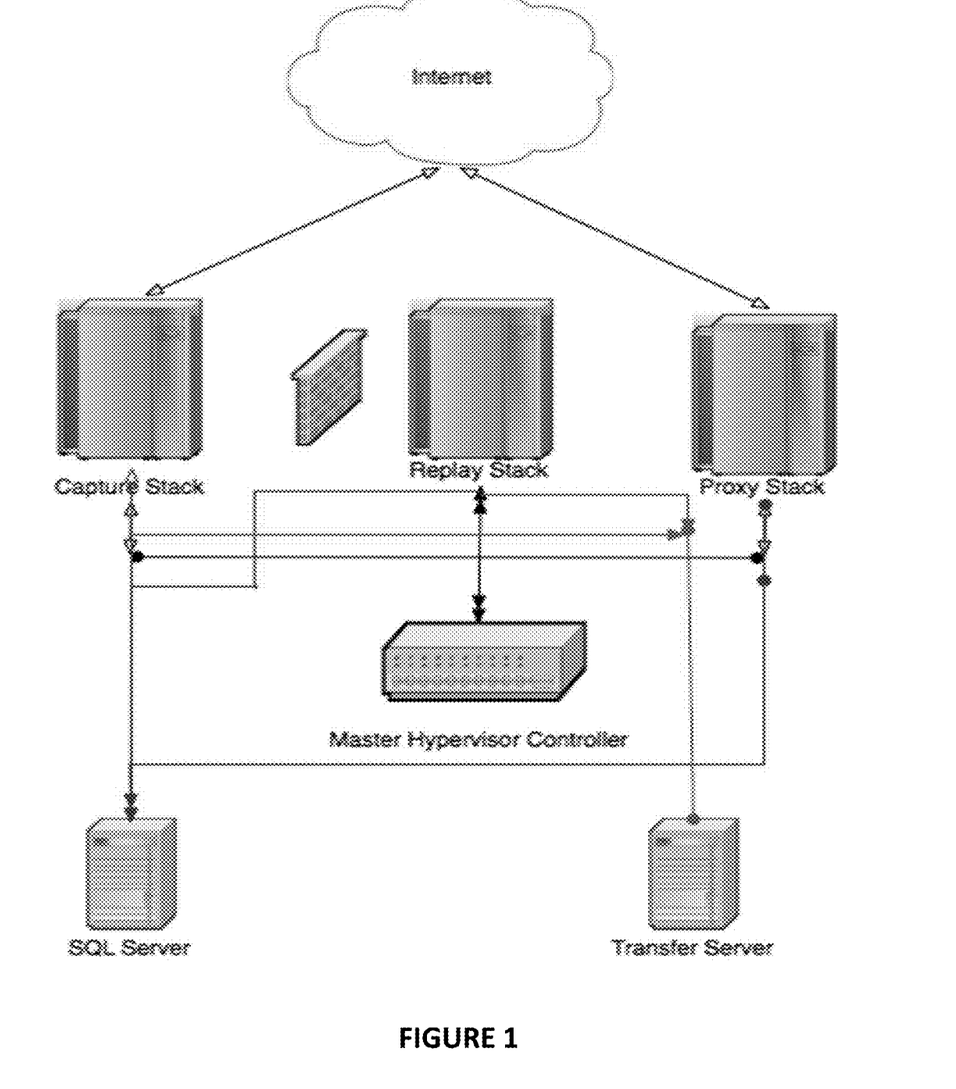
FIG. 1 shows the high-level architecture of the major components of BaitNET.

As shown in FIG. 1, the system utilizes three arrays of servers and networking hardware known as "stacks." Each stack is any number of physical servers that host virtual machines ("guests".) The exact number of servers and guests is based on the scope and scale of the testing and research being performed. Typically, within "Live Testing" this will be many tens of thousands of guests. FIG. 1 illustrates the interoperation/communication of the various stacks of servers and guests with the infrastructure support servers, as well as which components have Internet connectivity.

Specifically, the system may be implemented using the computing resources shown in FIG. 1 including the stacks. As shown in FIG. 1, the system may be implemented with a capture stack, a replay stack, a proxy stack. The system may also have a master hypervisor controller that controls each of the stacks as well as one or more SQL servers (for storage of data and the like) and one or more transfer servers. As shown in FIG. 1, the capture stack and the proxy stack have access to a computer network, such as the Internet. The capture stack implements the capture process described below, the replay stack implements the replay process described below and the proxy stack implements the proxy process described below. Each of the stacks may be implemented using one or more computing resources, such as one or more cloud computing resources or one or more server computer resources. Each of the one or more computing resources may have a processor and memory and a plurality of lines of computer code that may be stored in the memory and executed by the processor to implement the capture, replay and proxy processes described below. Each of the stacks also may be implemented as one or more virtual machines that are controlled by the hypervisor controller.

Figure 2A:
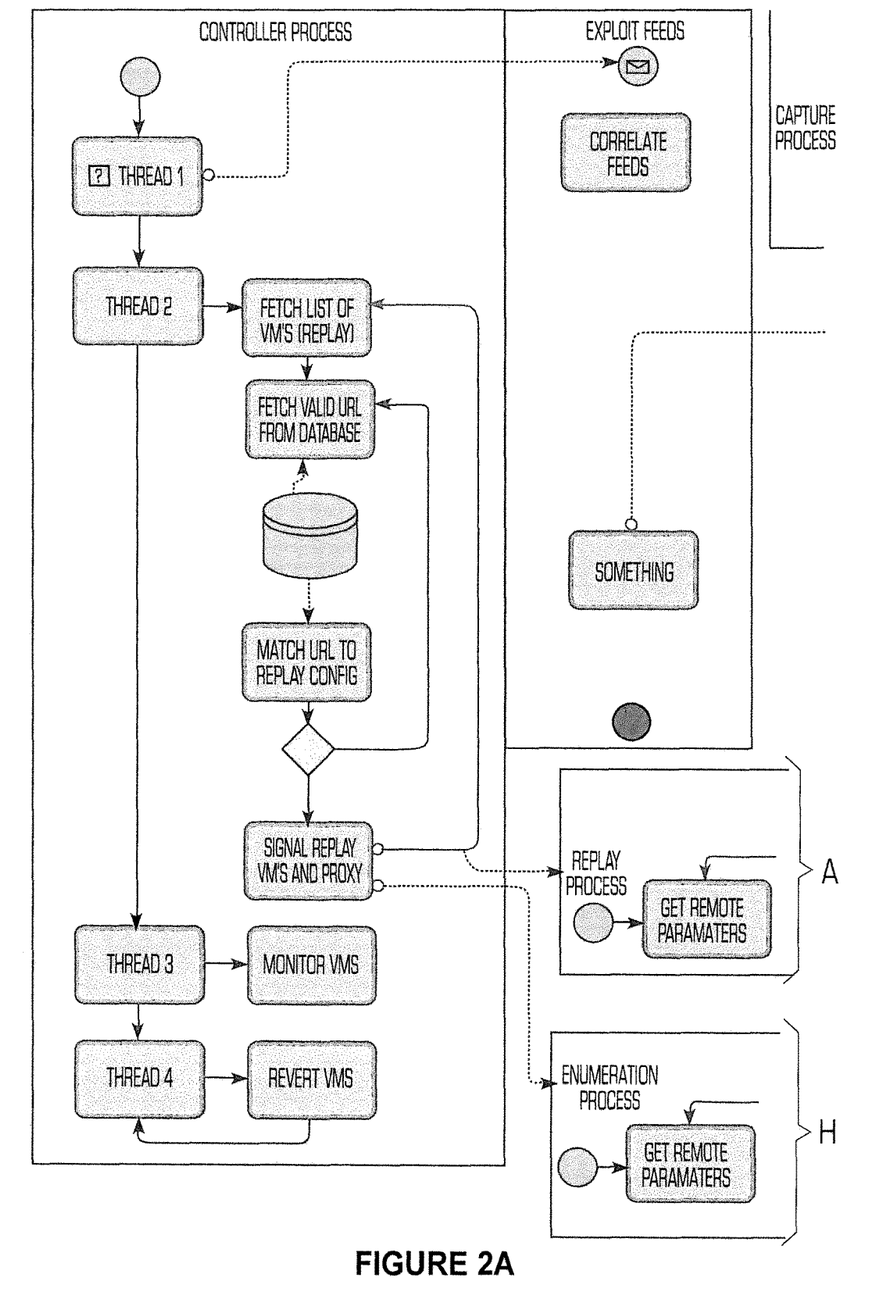
FIGS. 2A-2D illustrate the process control and internal operations of the BaitNet Control Process and its interoperability with the Capture, Replay, and Proxy processes.
Figure 2B:
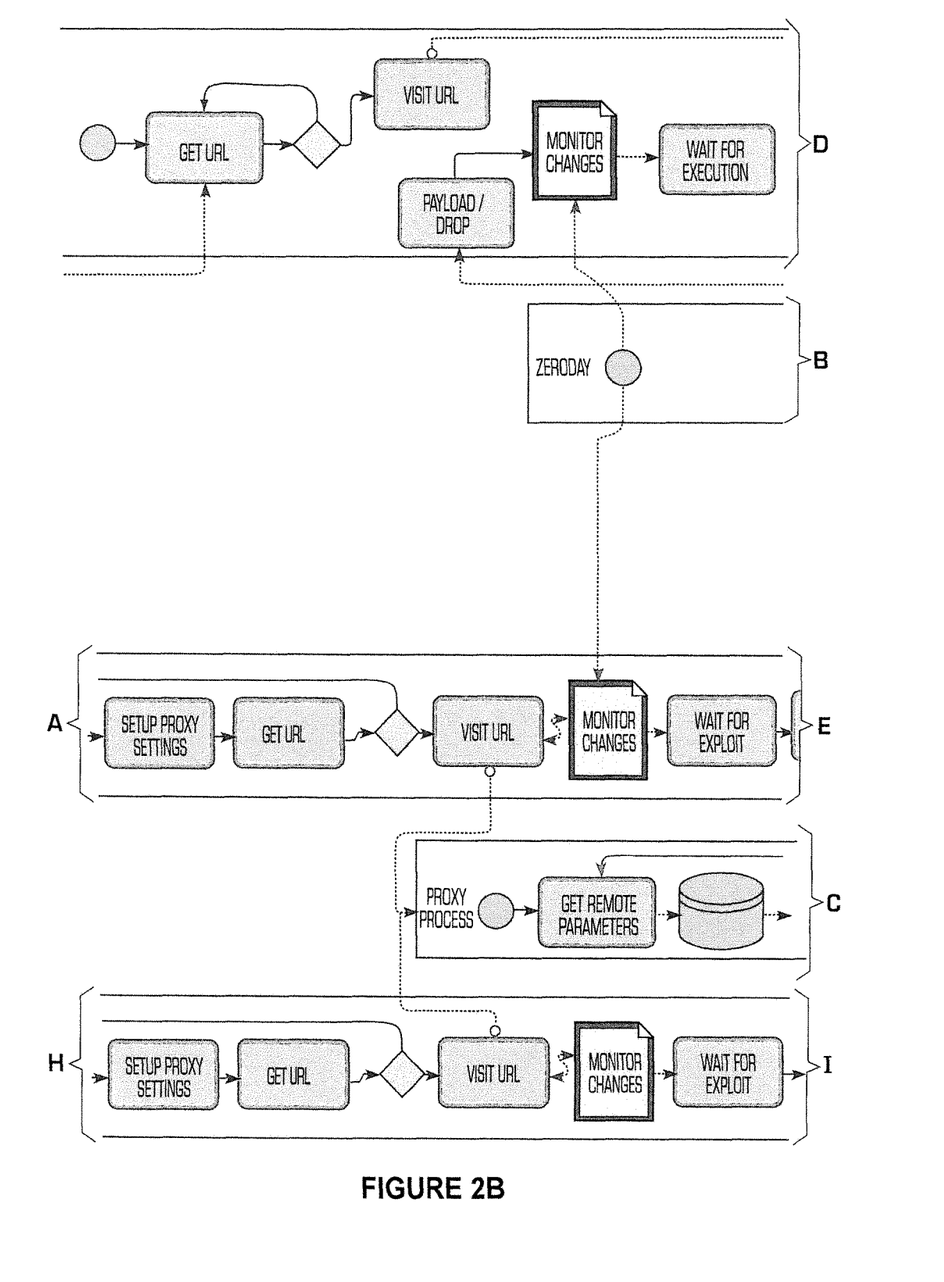
Figure 2C:
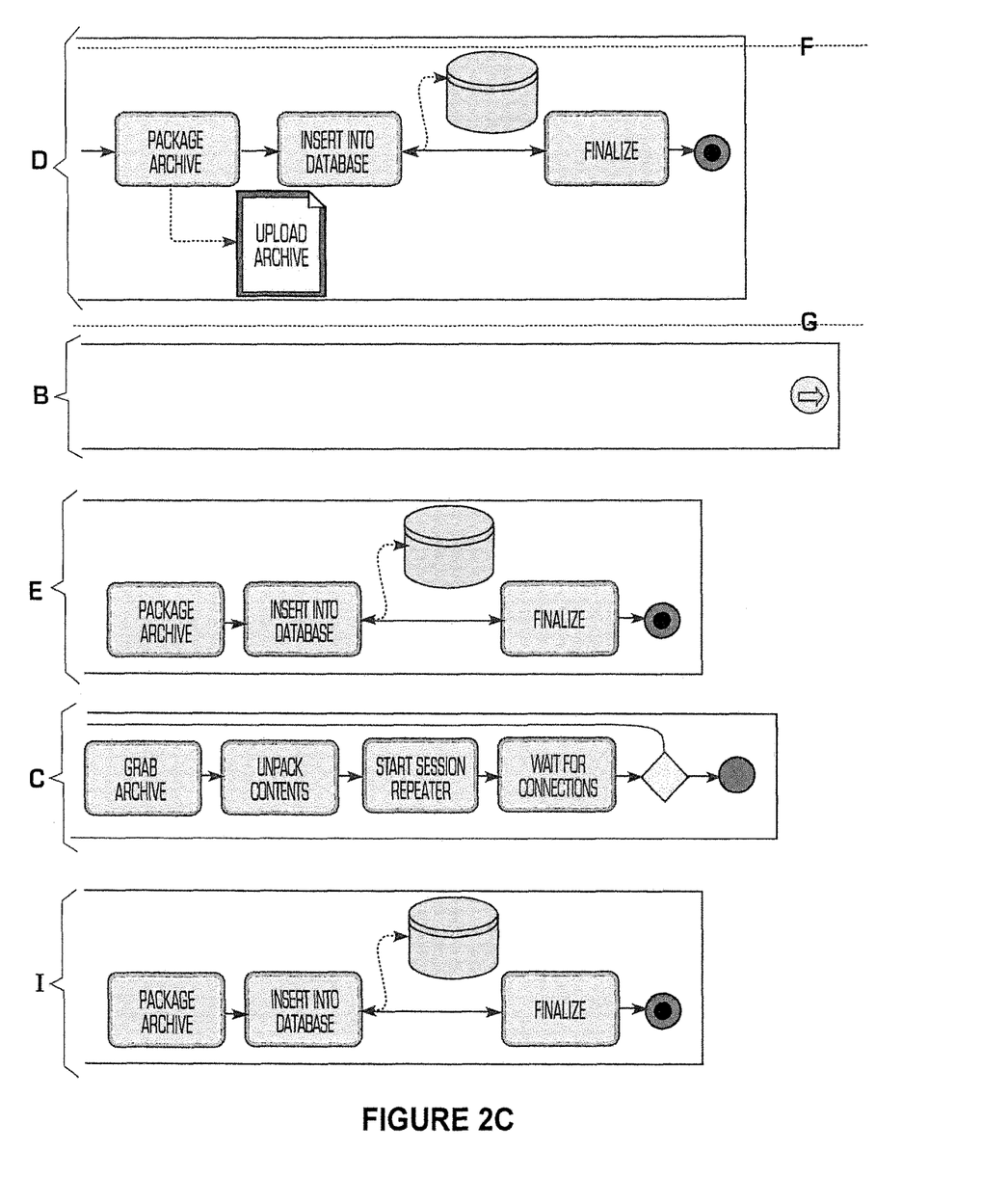
Figure 2D:
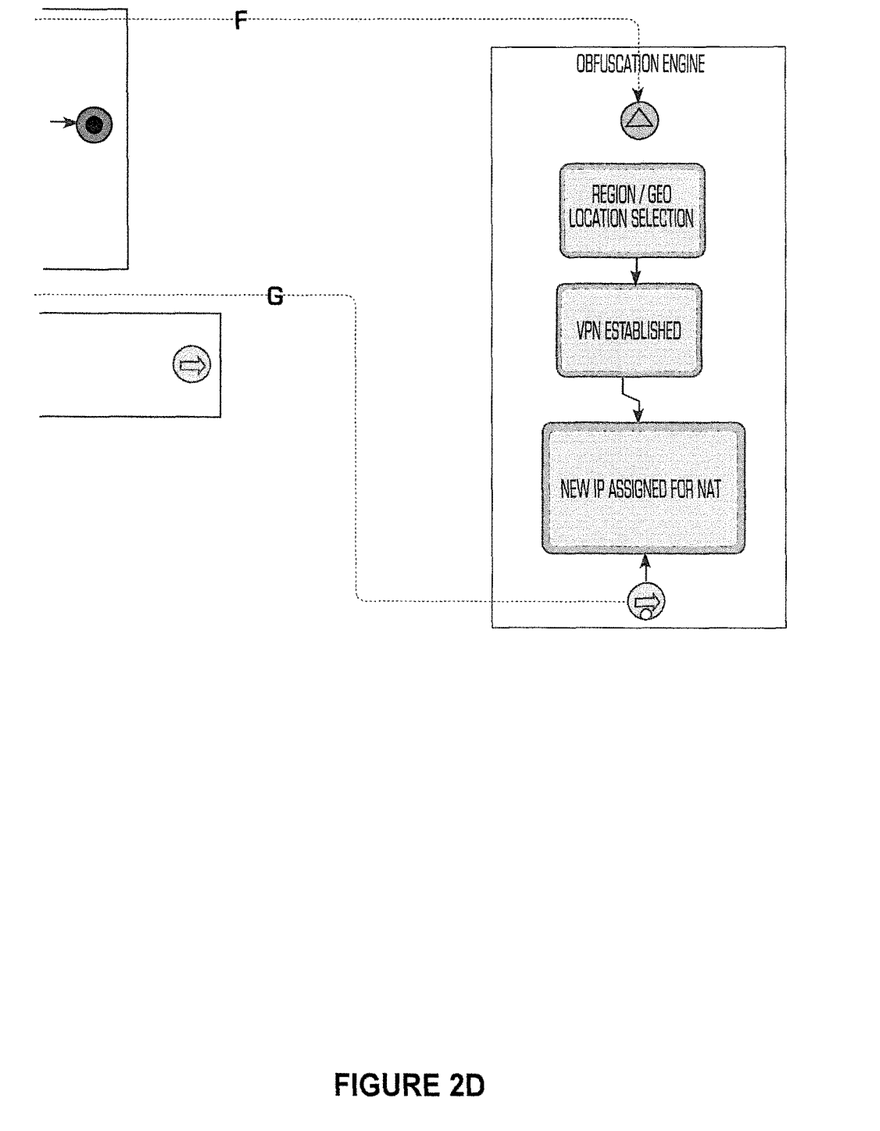

FIGS. 2A-2D illustrate the process control and internal operations of the BaitNet Control Process (implemented by the master hypervisor controller) and its interoperability with the Capture, Replay, and Proxy processes. The controller process and part of the replay process are shown in FIG. 2A with the replay process also being shown in FIGS. 2B and 2C as shown by the reference designators (A and E) that show how FIGS. 2A, 2B and 2C connect to each other to show the replay process. FIGS. 2B and 2C also show the details of the capture process as shown by the reference designator D that shows how FIGS. 2B and 2C connect to each other to show the capture process. FIGS. 2B and 2C also show the ZeroDay process as shown by the reference designator B that shows how FIGS. 2B and 2C connect to each other to show the ZeroDay process. FIGS. 2B and 2C also show the proxy process as shown by the reference designator C that shows how FIGS. 2B and 2C connect to each other to show the proxy process. Finally, FIG. 2D shows the details of the Obfuscation Engine with references F and G showing the interchange between the capture process and the Obfuscation Engine. Also illustrated are the interchanges with the Obfuscation Engine, Exploit Feed, and ZeroDAY modules. FIGS. 2A-2C show an enumeration process as shown by the reference designators (I and H) that show how FIGS. 2A, 2B and 2C connect to each other to show the enumeration process.

The BaitNET system may be operated by NSS Labs ("NSS"). Using sources from around the globe, the BaitNET processes begin with the correlation and normalization of various feeds that NSS subscribes to for information regarding potentially malicious websites (shown as SOMETHING in FIG. 2A). This normalized data is presented to BaitNET's Capture Process and is queued as targets for each of the configured operating system variations that are assigned to series of testing. BaitNET, using the Capture Process, issues the URL to each of the thousands of systems, utilizing thousands of variations in configurations, and each system in turn visits the URL using disparate VPN tunnels, a mechanism of the Obfuscation Engine within BaitNET's Capture Process, from around the world to obfuscate their true geographical location as well as to explore the geo-location filtering that may be employed by the malicious URL. If successful, a visit to the URL will result in a "drop" of malicious code to the target workstation. BaitNET monitors the download of the malicious code; and records the network traffic, creates a copy of the malicious code, and catalogs all changes to the operating system made by the malicious code. Additionally, the Capture Process will record any and all outbound communications from the now infected/compromised workstation. This outbound traffic will include any Command and Control (C&C) communications, often identifying the true threat actor, as well as any data being exfiltrated from the now infected system. Examples of the user interfaces of the system that show, for example, the data captured during the capture process are shown in FIGS. 3-6.

Figure 3:
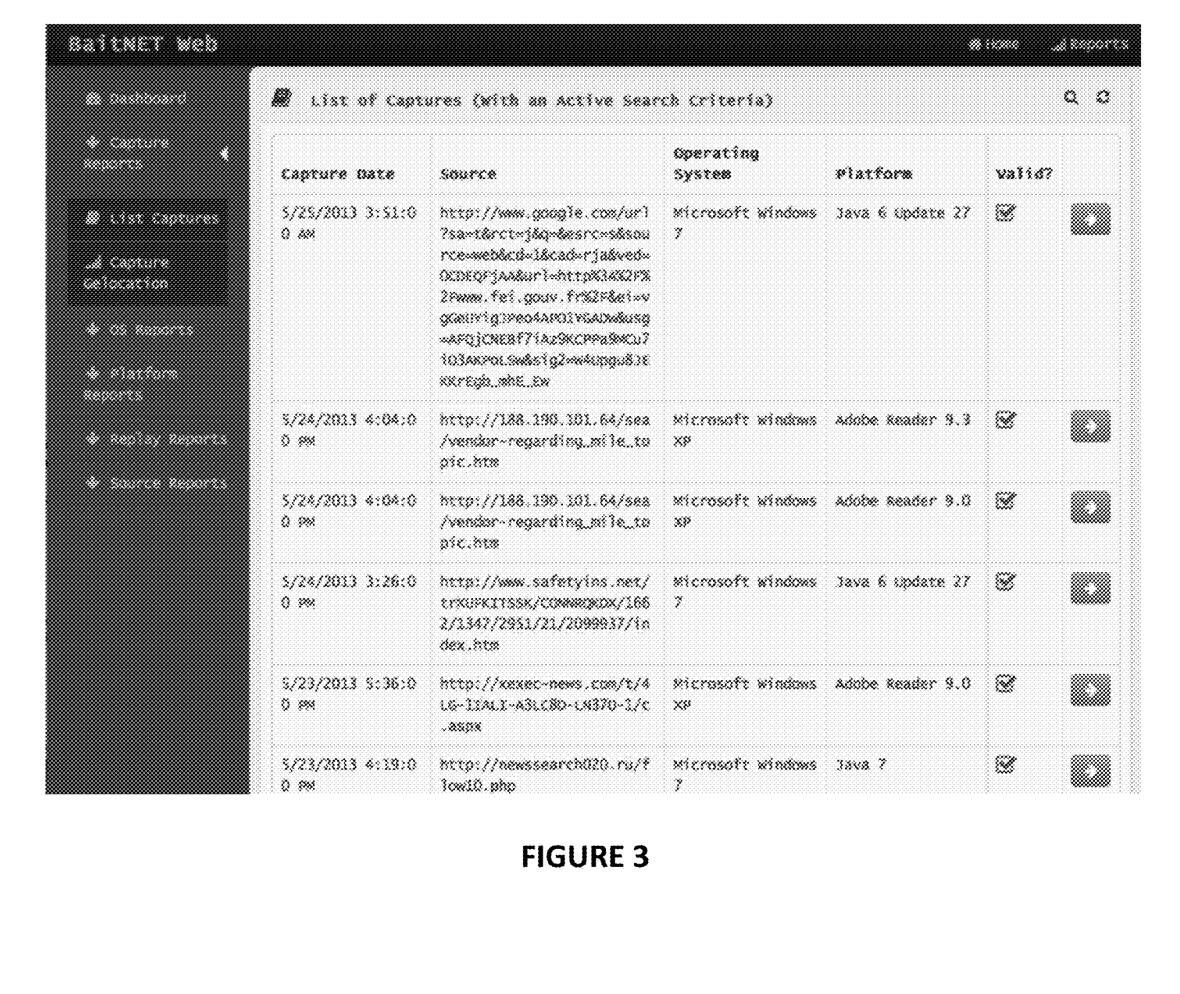
FIGS. 3-6 are examples of the user interface of the BaitNET system of FIG. 1.

FIG. 3 is an output from the system which illustrates validated exploits that have been discovered by the BaitNET system. The capture date, e.g. the date and time the malware or exploit was downloaded, is shown along with the corresponding source URL (Universal Record Locator) which shows the full path to the file on the infected/malicious website, the exact operating system that was used on the guest (virtual) workstation that the malware/exploit executed upon, and the exact application that the malware/exploit targeted (needed to be successful.) In this example, the first exploit in the list uses Java version 6 update 27 on Microsoft Windows 7 and was downloaded from a URL which was redirected (linked) on a google.com website. A user of the system can click any of these fields to drill-down into more detailed information. E.g., The "Source" section provides IP addresses, packet capture data, geo-location information, etc.

Figure 4:
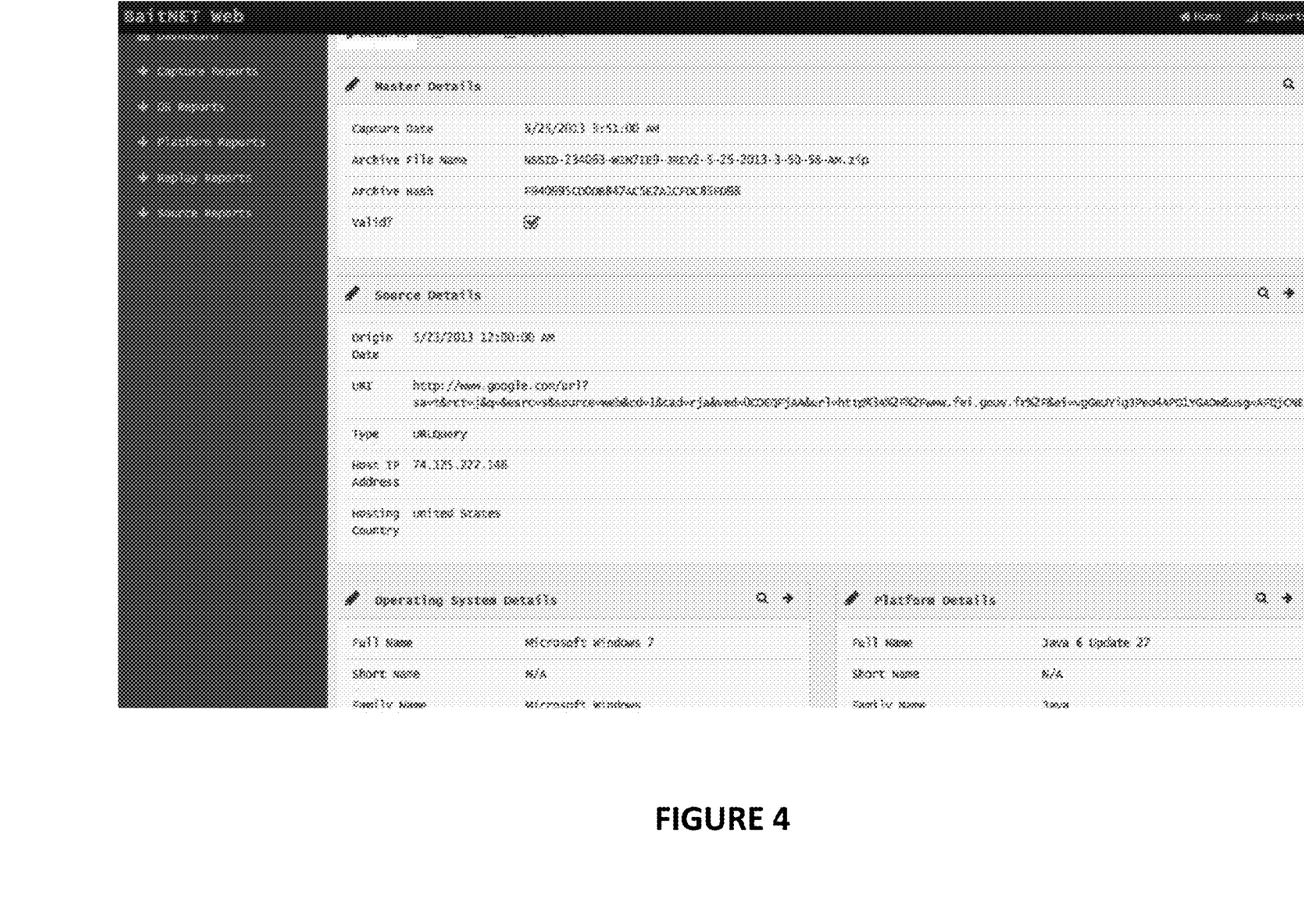

FIG. 4 is output from the system which illustrates detailed information on the "drop" or malicious file that was downloaded and has been validated to be malware/exploit code. Again the pertinent date and time is displayed, a unique filename is presented which was generated by the system when the malware/exploit was captured. This file contains the malicious content and can been downloaded in its archived (safe) version for inspection and reverse engineering. The hash value (MD5) of the archived file is presented so that the end-user can validate the file from the repository has not been altered. The system will indicated, as presented in this example, that the malware/exploit has been validated. Validation occurs when the BaitNET system utilizes the Proxy and Replay Processes to confirm infection and execution of the captured malware/exploit. The center section of the page reflects the URI where the file was collected from (This matches the data on FIG. 3) the type of URI/attack used, the IP address of the server that hosted the malicious file, and the country of origin of the IP address (aka "geo-location.") Further detail is presented on the operable target platform(s) that were successfully infected with the malicious content.

Figure 5:
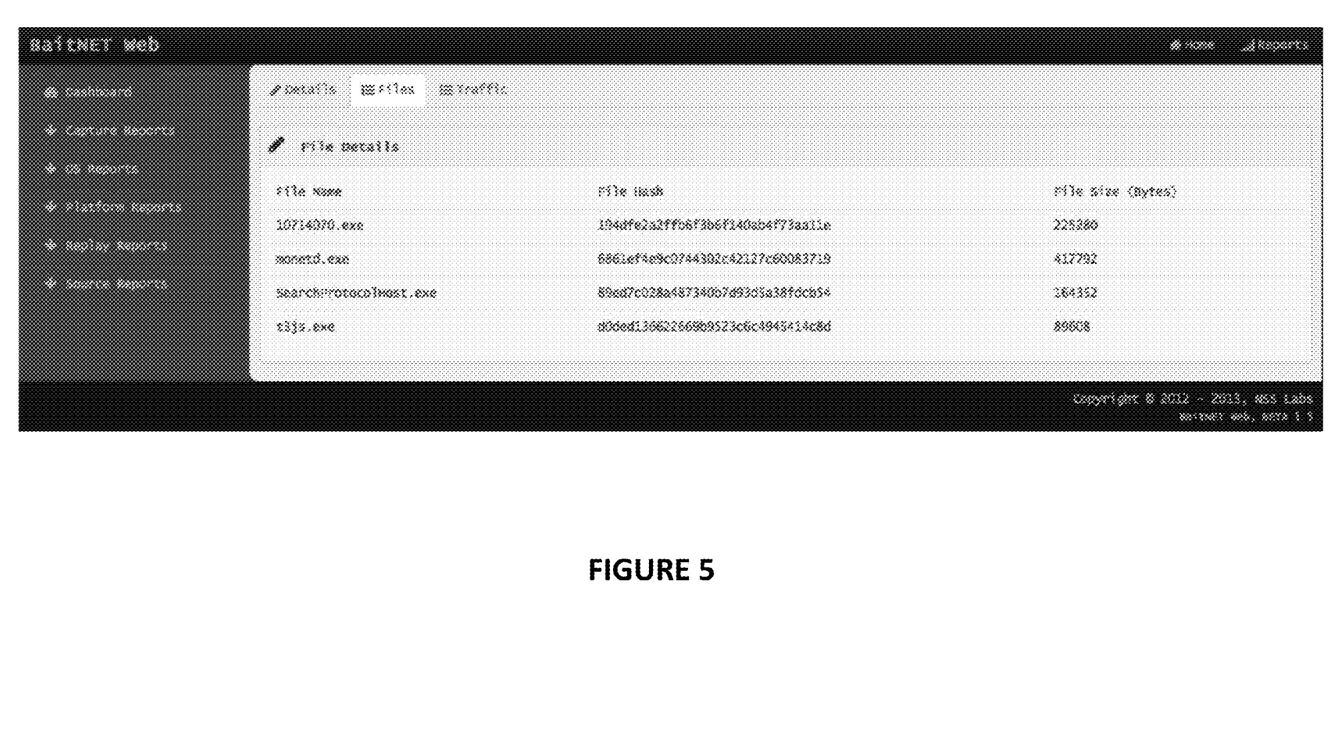

FIG. 5 is more detailed information from the system with regard to malicious content (malware/exploit code) that was captured. Here the end-user can find the hash (MD5) of the malicious executables (files) along with the exact size of each file. This information can be used to update in-line security systems such as an IPS, NGFW, or even endpoint products such as anti virus to now identify the hash values of the now known malicious content and block it from either being downloaded (in-line devices) or executed (end point products.)

Figure 6:
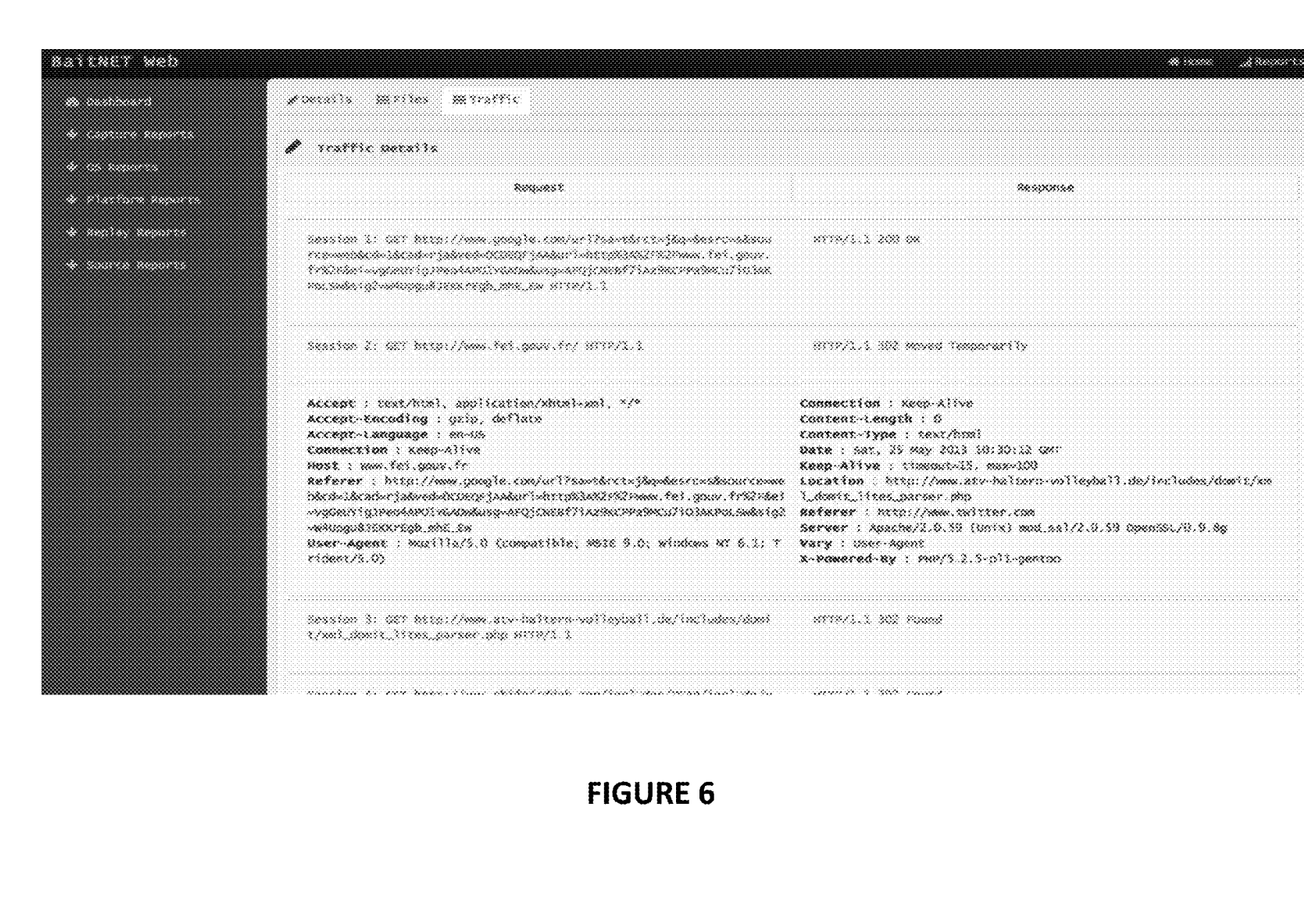

FIG. 6 contained detailed information on the URI and network behavior of the malicious website when accessed by the guest systems inside of BaitNET. The information provides an end-user with the network packet capture (pcap) data that is relevant to understanding the attack vector. Provided are the full URI, protocol of the attack (in this case http v.1.1) the specific web browser used (Mozilla 5.0), the actual URI of the drop (in this case a sever in with a .DE, Germany, domain), as well as information about the server such as the web server operating platform (in this case Apache 2.0.59 running on a UNIX operating system with Mod and Open SSL.) This data can be used by end-users to write firewall rules as well as other rules within in-line systems such as IPS, IDS, WAF, and NGFW. The exact vector of the attack being provided; which includes hosting, transmission, and target configuration are vital pieces of information that are uniquely provided by BaitNET.

The system that was successfully infected is now reset to its virgin state, thus preparing it to be reused for the next URL in the queue. All the data collected is parsed into two different databases (stored in the one or more SQL servers.) The first database, used for logging and intelligence, stores the attack vector, information on the system that was successfully infected; as well as all other metadata on the malicious URL, code, attack vector, C&C, and activity of the malware. The second database, the Replay Database, is now populated with the copy of the malicious code, the configuration information for the malicious URL (metadata, configurations, code, deployment vectors, etc.) and is used during the Replay and Enumeration Processes.

The Replay Process is now queued using data from the Replay Database. During the Replay Process, systems matching the configuration of the host that successfully was infected during the Capture Process are prepared for testing of the malicious code. To prepare the systems, all recent versions of products being tested (in-line security devices to endpoint protection products/anti virus) are automatically configured. Copies of the workstation used during the Capture Process are configured as Replay Hosts with the latest versions of any and all endpoint protection products being tested. In-line security products such as intrusion prevention systems and next generation firewalls stand in wait on the network between the Replay Hosts and the Replay Servers. The workstations visit an internal (LAN-based) URL that has been created by BaitNET as a perfect copy of the malicious URL that was validated during the Capture Process. As each copy of the workstation is presented with the internal URL, BaitNET once again monitors the workstation capturing all metadata related to the malicious code. If the code is successful in reaching the workstation and then executing properly the endpoint protection product being tested has failed to identify and/or stop the malicious code. If, during the visit to the internal URL, the drop is prevented, thus malicious code is prevented from ever reaching the workstation, then the in-line security product was successful in identifying the exploit and worked as designed.

During the Replay Process, the effectiveness of the malicious code is tested in a live environment. For example, all major makes and versions of web browsers are tested to determine which are susceptible to the exploitation during a drive-by type attack. e.g., an attack that executes within the browser and does not require the end-user to manually execute the malicious code. Different versions of application systems, language packs (localization data), base operating system revision, and even different architecture such as iOS or Android mobile devices can be checked against the copy of the malicious URL and the malicious code itself.

During the replay process, data is recorded into the Replay Database identifying which workstations were infected, how they were configured, and what in-line and endpoint protection products, if any, were being tested. After product testing has concluded, the Replay Process is reused with the same attack code to test different iterations of workstation platforms. This data is also recorded by BaitNET and is used in the Enumeration Process for Threat Forecasting, as it is a means to index all variations of the applications and operating systems being targeted by that specific malicious code.

For Threat Forecasting, the Enumeration Process can be used to continue to check localization configurations and geolocation exit points on the Internet to determine the full scope of the attack vector, provide intelligence on the threat actor(s), and harvest as much viable metadata as possible. This process is key in enumerating the various configurations of operating system, browser, applications, security products, etc. that the malware can use to successfully execute itself. The collation of this intelligence allows modeling to be performed, as well as direct risk assessments, so that consumers understand if their systems, networks, and tools are at risk—and what to do, if anything, to protect them against active malware/exploit campaigns.

All data, to include network traffic captures (aka "Pcap") are retained in the databases and can be reused by the system at any time. New workstation configurations, to include mobile device configurations, can be presented to the captured malicious URL for future testing. All tested products can be retested to confirm that patches/updates supplied by the vendor are working as designed, to outline exactly which systems provided by $3^{rd}$ parties are susceptible to the attack ("Gold Images"), and to validate attack data captured during the Capture Process.

During the Replay Process, a Proxy Process is generated and utilized. This proxy process facilitates the ability of BaitNET to perform continual testing against the malicious URL that was collected during the Capture Process without the need of the original/actual malicious URL. This is important due to the short lifespan of most malware campaigns, security features within the malware campaign to identify and prevent drops of malicious code to systems on the same network, and to obfuscate/protect the research and investigation into the malware campaign. The Proxy Process uses the original source code of the malicious website as recorded by the Capture Process which was fed by the URLs from the Threat Feeds. The Proxy Process emulates the remote server, source code of the website, and will serve (hand-out) the malware in the same way that the original web site did.

The Proxy Process is completely automated, and pulls all data from the databases crated during the Capture and Replay Processes. This includes the formulation of remote parameters of the original malicious website, pulling and reassembling the archive of the original malicious website, unpacking the archive, and finally launching and managing the fully-functional copy of the malicious website.

The Enumeration process, much like the Replay Process, utilizes the data within the BaitNET suite of databases and utilizes the Proxy Process to virtually revisit the malicious websites. Unlike the Replay Process, which uses the first viable combination of operating system and software which allowed the malware/exploit to execute properly and is used to test the efficacy of security products, the Enumeration Process has been designed to enumerate all possible variations of operating system and installed software across various platforms (computers, mobile devices, etc.) to determine all viable combinations that would allow the malware/exploit to execute properly. This data can been fed back into the Replay Process whereby each valid iteration can be used to test other security products.

In one implementation, the entire BaitNET suite of processes may take place in parallel, currently utilizing four parallel threads that are responsible for managing each of the aforementioned processes (Capture, Replay, and Proxy) along with their sub-processes such as the Obfuscation Engine shown in FIG. 2D and modules covered within this document such as ZeroDAY and are collectively controlled from the Control Process. Additionally monitoring of the virtual machines (VMs) and the setup and tear down (establishment and reverting) of the VMs along with their guest operating system and application configurations take place from within the Control Process.

Full control of the VM architecture is done through BaitNET's Control Process (implemented by the Master Hypervisor Controller in FIG. 1), which is modified to operate natively and replace the virtual machine tools for the specific hypervisor. e.g., BaitNET replaces VMWare's VMWare Tools and completely controls the guest and host controls within the hypervisor. This control is automated and functions as a separate thread during the Control Process and works in parallel with the Capture, Replay, and Proxy processes. BaitNET can procure, configure, and operate VMs on demand, autonomously, and scale resources during testing.

Due, in part to the Control Process' replacement of the virtual machine tools normally used within the hypervisors, as well as it's integration of those tools into the operating system itself by modifying system level dynamic link libraries (DLLs) and other system or library calls, the hypervisor itself is now hidden from the malware. Additional cloaking technologies that prevent detection of BaitNET are covered herein within the model overviews.

As outlined herein, BaitNET is a system of custom developed applications, application program interfaces (APIs), and kernel-level modification, such as the AI Module of the system, the Obfuscation Module of the system, the ZeroDAY module of the system and the capture process, for example which are applications. The applications for both the hypervisor host and the guest functionality as well as the operating systems. BaitNET currently supports all versions of Microsoft Windows operating system, all Intel-based versions of OS X, iOS, and Android. One key feature for BaitNET is its ability to render the "VM Detection System" (e.g. ability to discern a virtual machine from a physical/real machine by malware) found in modern malware/exploits useless. BaitNET modifies the hypervisor control system, replacing it's API, as well as produces real-user-like random movements of the mouse and other UI devices to trick malware into believing it is on a real host. This thwarts the ability of malware to detect a VM, which would normally prevent it from deploying its payload as VMs are often used in anti virus systems to incubate suspected executable files. BaitNET is also capable of detecting and monitoring virtual machine/microvisor malware. This type of malware will launch virtual sessions or even full virtual machines within the infected host, these machines are undetectable as are the malicious software running in them because other detection systems are only aware of the main operating system and instance of the system.

Using the system, the malware, or exploit, can be captured, identified and replayed through BaitNET's replay server and replay technologies (modules) against any number of other guests operating any variation of application, patch-level, or operating system to determine the true target impact of the exploit. E.g., If the exploit or malware was first detected using Windows 2008, SP1, running Adobe XYZ-version, BaitNET can then test the malware against all other variations of Windows operating systems, difference versions of Adobe products, etc. to identify which configurations of systems are susceptible to the malicious software.

In one implementation, the BaitNET system is primarily written to work within VMware's ESXi, but originally was designed to work with Microsoft's Hyper-V. Modifications can be made which would allow it to run on any hypervisor system, thus supporting multiple hypervisors communication channels. It does this seamlessly and smartly through the hypervisor module associated with BaitNET that replaces the native host-to-guest API, additionally BaitNET can be operated on Bare-metal, however performance will become an issue and this would not be as scalable. BaitNET can scale to an infinite number of VMs within a cloud construct as long as the hardware can support the additional guests.

BatiNET's functions are expanded and complimented through the use of modular components (Modules) described below in more detail, each of which provides functionality used in threat forecasting and the evaluation of $3^{rd}$ party security product effectiveness as shown in FIG. 2.

ZeroDAY Module

This module is a state of the art plugin for BaitNET allowing it to detect any type of exploitation attack, and was developed to identify 0 day attacks, e.g., Exploits and malware that have yet to be categorized or identified within the security community, often meaning there is no currently known defense to these attacks as the maintainers of the commercial or OpenSource products being targeted are themselves unaware of the flaw being exploited. Capable of dissecting the attack and recording the smallest components, uncovering how every intricate step and security mitigation tactic was used to achieve the attack. This module is based on unique knowledge that the owner of the BaitNET system has developed through various research projects. ZeroDAY is effective when presented with the most complex and customized/never before seen malware as used in advanced persistent threat (APT) attacks. The module can be set to detect and catalog the attack, or detect and block the attack. Unlike EMET, Microsoft's current security mitigation technology, which is easily bypassed, ZeroDAY utilizes the combined filtration of kernel32, kernelbase and ntdll. The general capabilities of ZeroDay are outlined herein.

Key Features of ZeroDAY—

ZeroDAY may perform any or all of the following industry recognized tasks for recognition and cataloging of exploits:

In-Memory ShellCode detection
Raw ShellCode dumping (raw output of shell code—to file)
Raw ShellCode disassembly (post analysis)
ShellCode emulation ☐
Identify APIs used in the ShellCode
Log API parameter information: ☐
a. Network
b. Memory
c. File
d. Process
ROP detection
ROP gadgets detection
ROP gadgets dumping with backward disassembly (module+function)
HeapSpray detection
NOP Sled detection
Null Page Allocation Detection ☐

In general ZeroDAY can monitor and protect any application in user-land (ring-three e.g., "r3"), but can only monitor and not protect against kernel-land (ring-zero e.g., "r0")—exploits affecting the OS services directly, it will still be able to protect against kernel based exploits being served through user-land and any other application that utilizes this attack vector.

Additional Info

The system provides stack validation and monitoring that includes the protection from direct access to Kernel32, KernelBase and NTDLL DLLs APIs, unlike the current EMET 3.5, so the return oriented programming (ROP) is not protected against KernelBase dynamic API loading.

The system may also have a CODE/TEXT section permission change monitor. This monitor is a novel process/mechanism. This mechanism allows the detection and monitoring of privilege escalation through a process whereby the system monitors for code/text changes. This is possible due to the way that ZeroDAY integrates into the kernel and ties directly into primary system sub processes.

A semi control-flow-transfer (CFT) checks is part of the system and all system calls (r3) will still tunnel back to the original one in the kernel (r0). Therefore, calls will be filtered through KiFastSystemCall [SystemCallStub] (triggered by interrupt vector int 0x2E)

Post-analysis by the system is important because of the following reason(s):

Having in-hand samples, which are then automatically analyzed to identify how the attack was carried out in-depth, and using which ☐gadgets, DLLs and so forth.

ZeroDAY was designed not only to detect and/or stop the attack, but also to ☐find information regarding post-attack. Which may include communicating ☐with a command and control (C&C) server, downloading of more malware and so on. It serves well to automate the detection, post-automated analysis of the attack and gathering in-depth information for data analysis (Briefs, Blog ☐posts, etc) which other individuals or companies do not have.

VM+SandBox Detection Avoidance and Circumvention Module

Almost all malware detects the presence of/if it is hosted by an operating system managed as a virtual machine (VM.) aka "SandBox" and will avoid execution and revealing their control-flow (CF) to be dynamically analyzed. This was developed to circumvent this anti-detection capability in modern malware; it will detect whether the dropped malware is a result of an exploit or was simply the result of typical drive-by's that attempt to avoid execution within a VM or a Sandbox. There are multiple options for circumvention of the anti-detection technology within malware:

1) Direct in-memory patching based on signatures developed in the lab using advanced regular expressions and Boolean algebra 2) Hijacking the system calls made by the malware through a proxy stub, trampolining the original code with the new one and feeding the malware the wrong results tricking it to run as expected on a bare-metal machine.

AI Module

This module is responsible in generating artificial human activity in the VM. As some malware will check for the lack of mouse activity or keyboard activity or even processes being spawned. The absence of activity from these human interface devices, along with the absence of ancillary processes and applications are indicative of a automated machine, and therefore a trap. The AI Module corrects this oversight in other incubation systems by injecting randomized mouse movements and usage, keyboard input to include realistic typing patterns, mistakes variations in speed, etc. The AI Module also opens and closes ancillary processes, such as chat software, email clients, etc. All producing real life user behavior on the virtualized systems. The system may open email, for example, check various items in the inbox, respond to email, or chat online with other systems and real users. Any program can be added to the AI Module, to include sophisticated systems such as computer games, and office products where assets such as spreadsheets, presentations, and documents can be created. All of this produces a very realistic usage of the machine.

The AI module and Sandbox modules may be part of the system (like the ZeroDay module) in FIGS. 1 and 2, but is not shown in these figures.

VM Templates

All the VM images being used across the stacks are created from custom made templates, which use the underpinning of the Control Process, which integrates the virtual machine controls into the base operating system, thus hiding the Guest OSes and appearing like a normal bare-metal machine. This includes options such as:

Getting the PTR location
Setting the PTR location
Direct Exec
NT Reloc
Self Modification
Reloc
BT Segment
BT Privilege
BT Mem Space
BT IN Port
BT Out Port

The invention claimed is:

1. A malware and exploit campaign detection system, comprising:
    a plurality of computer systems;
    a capture stack that is configured to issue a uniform resource locator to each computer system to download a piece of malicious code;
    a replay stack that is configured to test the piece of malicious code in a live environment and generate data about the replay of the piece of malicious code;
    a proxy stack that is configured to perform testing of the piece of malicious code without accessing the uniform resource locator, wherein the testing includes a formulation of remote parameters of an original malicious website, pulling and reassembling the archive of the original malicious website, unpacking the archive, and launching a fully-functional copy of the original malicious website; and a master hypervisor controller that controls the capture stack, the replay stack and the proxy stack.

2. The system of claim 1, wherein the capture stack, the replay stack and the proxy stack run in parallel.

3. The system of claim 1 further comprising a zero day module that identifies zero day attacks.

4. The system of claim 1 further comprising Structured Query Language (SQL) servers configured to store data of the computer system.

5. The system of claim 1 further comprising a transfer server.

6. The system of claim 1, wherein the capture stack is configured to create a copy of the piece of malicious code and catalogs operating system changes caused by the piece of malicious code.

7. The system of claim 1, wherein the capture stack is configured to capture communications with the plurality of computer systems.

8. The system of claim 1, wherein each stack is one or more server computers.

9. The system of claim 8, wherein each stack has a virtual machine.

10. A malware and exploit campaign detection method, method comprising:

providing a plurality of computer systems;

executing a capturing process, wherein the capturing process issues a uniform resource locator to each computer system to download a piece of malicious code;

executing a replay process, wherein the replay process tests the piece of malicious code in a live environment and generates data about the replay process of the piece of malicious code;

executing a proxying process, the proxying process performs testing of the piece of malicious code without accessing the uniform resource locator, wherein the proxying process includes a formulation of remote parameters of an original malicious website, pulling and reassembling the archive of the original malicious website, unpacking the archive, and launching a fully-functional copy of the original malicious website; and controlling, using a master hypervisor controller, the capture process, the replay process and the proxy process.

11. The method of claim 10 further comprising executing the capture process, the replay process and the proxy process in parallel.

12. The method of claim 10 further comprising identifying, using a zero day module, zero day attacks.

13. The method of claim 10, wherein executing the capturing process further comprises creating a copy of the piece of malicious code and cataloging operating system changes caused by the piece of malicious code.

14. The method of claim 10, wherein executing the capturing process further comprises capturing communications with the plurality of computer systems.

* * * * *